United States Patent Office 3,563,777
Patented Feb. 16, 1971

---

3,563,777
PLASTER COMPOSITION HAVING INCREASED AIR ENTRAINMENT
Richard J. Pratt, Flossmoor, Michael A. Stram, Chicago, and David W. Young, Homewood, Ill., assignors to Sinclair Research, Inc., New York, N.Y., a corporation of Delaware
No Drawing. Filed Apr. 18, 1968, Ser. No. 722,216
Int. Cl. C11b 11/00
U.S. Cl. 106—111
10 Claims

ABSTRACT OF THE DISCLOSURE

A plaster composition is prepared having superior air entraining properties and reduced bulk density subsequent to setting, comprising a settable gypsum plaster and a minor amount of a water-soluble salt of the ester formed by reacting styrene-maleic anhydride copolymer with a monohydric alcohol of about 1 to 12 carbon atoms. Amounts of about 0.05 to 5 weight percent of the ester salt, based on the weight of the plaster, have been found to be effective in increasing air entrainment and thereby lowering bulk density in the plaster composition.

---

This invention relates to a plaster composition containing an air entrainer additive. More particularly this invention relates to a composition comprising settable gypsum plaster and a polymeric ester salt derived from styrene-maleic anhydride copolymer and an alcohol.

Settable gypsum plaster can be made by calcining gypsum ($CaSO_4 \cdot 2H_2O$) to remove most of the water of crystallization and form the hemihydrate. In the manufacture of structural materials containing calcined gypsum such as, for example, gypsum wall board, it is highly desirable to produce a final composition having a low bulk density without producing a composition having a prolonged time required for setting. The various reasons for this are, of course, that the lighter product is easier to handle in construction operations and in addition the lighter product, which contains substantial quantities of air entrained therein, has higher insulating value.

Water-soluble foaming agents have been employed as air entraining agents to lower the density of gypsum wallboards, for example alkali metal resin soaps and mono or dihydroxy lower alcohols have been employed as air entraining agents in gypsum. When these agents are employed as air entraining additives, foaming occurs by mechanical agitation of the aqueous solution of resin soap alcohol. The foam is then metered into the gypsum slurry. This procedure requires a foam of uniform bubble size and distribution, space-consuming foam tanks, in-line foam producers of dependable action, and a resin soap of composition. Resin soaps commonly employed, moreover, are derived from waste matter of natural origin. The compositon of products obtained in this manner is usually difficult to control and subsequently their performance cannot be predicted accurately.

It is therefore a object of this invention to provide air entraining additives which lower the bulk density of settable gypsum plasters and which additives, unlike compositions based upon resin soaps of waste matter of natural origin, are derived from polymeric esters of synthetic copolymers, which are prepared by controlled and established methods. It is a further object of this invention to provide an air entraining additive for settable gypsum plasters which does not require foam tanks, in-line mixers or foam metering devices.

These and other objects are achieved in the present invention by providing a novel plaster composition having improved air entraining properties and comprising a settable gypsum plaster, and a minor portion, for example, from about 0.05 to 5 weight percent or more based on the weight of the plaster, preferably about 0.1 to 2 weight percent, of a water-soluble polymeric ester salt derived from styrene-maleic anhydride copolymer and an alcohol. The settable gypsum is usually the major amount of the composition on a dry basis.

The ester salts of this invention include the water-soluble alkali metal hydroxides, ammonia, hydrocarbon amine and basic aminoalcohol salts, which are prepared by neutralizing the half-ester. The various water-soluble, salt-forming basic hydrocarbon amines may be employed in the present invention to form basic amine salts of the half-ester. Preferred amines are tertiary amines such as, for example, trifurfuryl amines. Alcohol amines, such as for example triethanolamines, may be employed as well as glycol amines of molecular weight up to about 1500 or capped glycol amines of molecular weights up to about 5000.

The plaster composition of this invention can be prepared conveniently by adding the neutralized ester salt either in dry form or as a solution or paste to the calcined gypsum plaster prior to, with or after the addition of sufficient water to cause the plaster to set. Thus the ester salt can be removed from the water and the dried ester salt mixed with the dry gypsum plaster to form plaster compositions of this invention. This does not, however, exclude other procedures which may be employed advantageously. For example, the ester salt may be added to the plaster slurry after water has been added but before the plaster has had an opportunity to set sufficiently to preclude mixing or the ester salt may be added to the water itself which is to be mixed with the plaster.

The styrene-maleic anhydride copolymer employed in the present invention contains a molar ratio of polymerized styrene to polymerized maleic anhydride of about 1:1 to 4:1 and has an average molecular weight prior to esterification of about 500 to 500, preferably about 1500 to 3000. The copolymer is reacted with a suitable alcohol to form the about 20 to 100 or more percent, preferably about 40 to 75 percent, half-ester.

Preparation of the styrene-maleic anhydride copolymer can be by known methods. A preferred method is by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Suitable esterifying alcohols include the monohydric aliphatic alcohols having from about 1 to 12, preferably about 1 to 8 carbon atoms, i.e., alcohols in which the hydroxyl group is attached to an aliphatic, including cycloaliphatic, carbon atom, although unsaturated or substituted alcohols can also be employed as well as aliphatically saturated and unsubstituted alcohols. Examples of suitable alkanols are monohydric hydrocarbon alcohols in which the hydroxyl group is attached to an aliphatic carbon, for example, propyl alcohol, cyclohexyl alcohol and hexyl alcohol, as well as mixed arylaliphatic alcohols such as benzyl alcohol.

Example I illustrates the preparation of styrene-maleic anhydride copolymer ester and the subsequent formation of the ester salt of this invention. Example II illustrates the formulation of a typical plaster composition of this invention employing the ammonium salt of the ester prepared in Example I.

EXAMPLE I

Ester preparation (1:1 styrene-maleic anhydride copolymer) A mixture of 25 grams (1.00 equivalent) of styrene-maleic anhydride copolymer having a molecular weight of about 1800 to 2000 and 60 grams (1.00 mole) of n-propyl alcohol was heated at 160–170° C. for four hours in an autoclave. The molten product on cooling, solidified. The solid ester was powdered before use. The results of titration with standardized sodium hydroxide indicated formation of the 66% half-ester.

A neutral 20% aqueus solution, prepare by stirring 20 grams of the partial ester product with 80 grams of water and 4–5 grams of concentrated ammonium hydroxide, was used in the following example.

EXAMPLE II

Air entrained plaster castings (0.2% additive)

A mixture of 0.45 gram of the above prepared 20% ammonium salt solution in 25 grams of water and 45 grams of molding gypsum plaster was stirred by hand for five minutes. A cavity 3 inches in diameter and ¾ inch deep was filled with this mixture. After 30 minutes the plaster casting was removed and conditioned for three days at 75° F. and 50% relative humidity.

Table I compares density of various plaster castings of this invention along with a plaster casting containing no air entraining additives. The density measurements of castings indicate the degree of air entrained therein. Castings containing more air are less dense. Density of castings are found by dividing the weight of grams of the casting by its volume in cubic centimeters. Volume was determined by the volume of kerosene which was displaced by the casting when completely submerged.

TABLE I

| Esterifying alcohol | Styrene-maleic anhydride copolymer | | Percent air-entrainer on wt. of plaster | Density of casting (grams cm.³) |
|---|---|---|---|---|
| | Monomer ratio | Molecular weight¹ | | |
| n-Propyl | 2:1 | 1,800 | 0.1 | 1.31 |
| | | | 0.2 | 1.21 |
| | | | 0.4 | 1.16 |
| Cyclohexyl | 1:1 | 1,800 | 0.4 | 1.33 |
| n-Hexadecyl | 1:1 | 1,800 | 0.2 | 1.42 |
| n-Amyl | 1:1 | 1,800 | 0.2 | 1.33 |
| Benzyl | 1:1 | 1,800 | 0.2 | 1.32 |
| Methoxypolyethylene glycol | 1:1 | 1,800 | 0.2 | 1.48 |
| Control, no additive | | | | 1.40 |

¹ Approximate.

As may be seen in Table I, the greatest air entrainment was obtained using 0.4 weight percent of the n-propyl alcohol ester of a styrene-maleic anhydride copolymer having a molecular weight of 1800 and a styrene to maleic anhydride mole ratio of 2:1.

It is claimed:
1. A plaster composition having increased air entrainment and lower bulk density subsequent to setting, comprising a settable gypsum plaster and a minor amount, sufficient to increase air entrainment, of a water-soluble salt of the about 20 to 100 per cent half-ester of a styrene-maleic anhydride copolymer having a molecular weight of about 500 to 5000 and a mole ratio of styrene to maleic anhydride of about 1:1 to 4:1, and a monohydric hydrocarbon alcohol of from about 1 to 12 carbon atoms.
2. The composition of claim 1 wherein the ester salt is an ammonium salt.
3. The composition of claim 2 which contains from about 0.05 to 5 weight percent of the water-soluble salt of the ester of styrene-maleic anhydride copolymer and an alcohol.
4. The composition of claim 1 which contains from about 0.05 to 5 weight percent of the water-soluble salt of the ester of styrene-maleic anhydride copolymer and an alcohol.
5. The composition of claim 1 wherein the styrene-maleic anhydride copolymer has a molecular weight of about 1500 to 3000.
6. The composition of claim 1 wherein the monohydric alcohol is propyl alcohol.
7. The composition of claim 1 wherein the ester salt is an alkali metal salt.
8. The composition of claim 1 wherein the ester salt is a basic aminoalcohol salt.
9. The composition of claim 1 wherein the ester salt is a hydrocarbon amine salt.
10. The composition of claim 6 wherein the ester salt is an ammonium salt.

References Cited

UNITED STATES PATENTS 2,913,346  11/1959  Hoffman _____ 106—88

FOREIGN PATENTS 717,838  11/1954  Great Britain _____ 106—309

JAMES E. POER, Primary Examiner

U.S. Cl. X.R.

106—88, 314